May 9, 1961 W. H. BOWDEN 2,982,972
BATHTUB
Filed Nov. 6, 1958 2 Sheets-Sheet 1

INVENTOR.
WILLIAM H. BOWDEN
BY
ATTORNEY

May 9, 1961   W. H. BOWDEN   2,982,972
BATHTUB

Filed Nov. 6, 1958   2 Sheets-Sheet 2

INVENTOR.
WILLIAM H. BOWDEN
BY
ATTORNEY

United States Patent Office 2,982,972
Patented May 9, 1961

2,982,972
BATHTUB
William H. Bowden, Alliance, Ohio, assignor to Allianceware, Inc., Alliance, Ohio, a corporation of Delaware
Filed Nov. 6, 1958, Ser. No. 772,226
4 Claims. (Cl. 4—173)

This invention relates to a bathtub, and particularly a porcelainized sheet-steel bathtub in which the tub and apron are manufactured separately and then butt-welded together. It includes the method of making such a tub.

According to this invention, the apron and rim of the tub are welded together along a straight line in an area somewhere between the bell of the tub and the portion of the apron which extends vertically downward. The weld is preferably located near the bell of the tub between horizontal portions of the rim of the tub and the apron, but it may be located farther from the bell of the tub near the vertical portion of the apron. In this latter case, after the weld is formed the apron is bent to its final position.

The weld is made in the substantial absence of air by sealing off the space between the two edges where the weld is to be formed. This is done by thin ribbons of metal placed above and below this space, and incorporating them in the weld as it is formed. The exposed surface of the resulting weld is abraded to remove excess metal and smooth off its upper surface. The tub is then porcelain enameled by any usual procedure. Such a weld is not porous as are most welds; it is exceedingly strong, and the porcelain enamel forms a firm bond with it.

The invention relates particularly to a tub with an apron along its front only, although the apron may extend along one end also. This apron is preferably completely formed before welding, although if the apron extends across the front of the tub only the portion of the apron which eventually is to be vertical may extend outwardly during the welding operation to give better access to the weld, and then be bent to the vertical position after the weld has been formed.

With the apron extending along only one side of the tub it is advantageous to turn the rim on the other three sides of the tub up to form a splash board which fits behind the tile or other wall covering to prevent any water from seeping down into the wall around the edge of the tub. In such a tub the weld is advantageously located so near the bell of the tub that the ends of it are included in the splash board at the two ends of the tub. In this case the weld is made before the splash board is turned up around the edges of the tub.

The invention will be further described in connection with the accompanying drawings, in which—

Fig. 1 shows the tub and the apron before the two are placed together for welding;

Fig. 2 is a view in perspective showing the tub and apron being welded together;

Fig. 6 is a view in perspective of the finished tub after enameling; and

Figures 1 to 5 show the unporcelainized metal of the tub before and after welding. Figures 6 and 7 show the finished porcelainized tub.

The bell 1 of the tub is preferably drawn in a single operation from a single sheet of steel of about 12 to 16 gauge. It may be formed in any of the usual ways. The rim 2 extends outwardly from the bell after drawing. The first step after drawing is to trim the edge 3 to a straight line. The edges 4, 5 and 6 are preferably trimmed to a straight line in the same operation.

Figure 7:
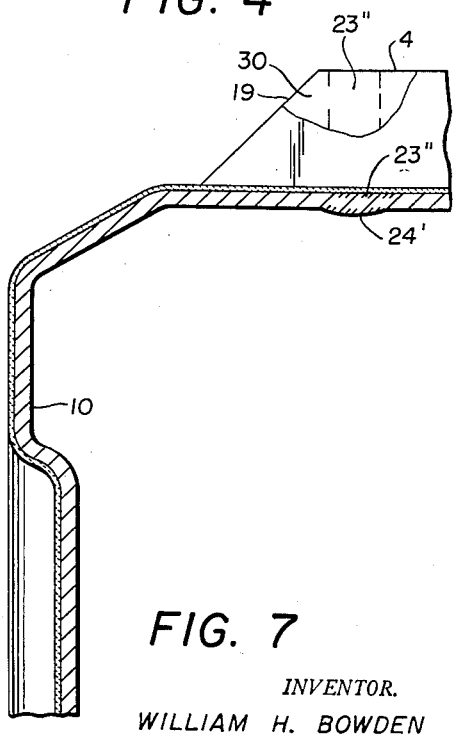
Fig. 7 is a section on the line 7—7 of Fig. 6 showing the enamel coating over the weld.

The apron 10 is partially or completely pre-formed before welding. The flanges 11 (if any) at the ends of the apron are turned back. Any suitable design, such as the design 13, may be impressed in the apron. The top 15 is partially or completely turned back so that the edge 16 can abut the edge 3 for welding. It will be noted that the ends 18 and 19 of the apron do not meet the edge 16 in right angles, but flare outwardly to coincide with the edges 4 and 6 of the rim of the tub and provide for the angular finish of the forward ends of the splash board as shown in Figs. 6 and 7.

Figure 3:
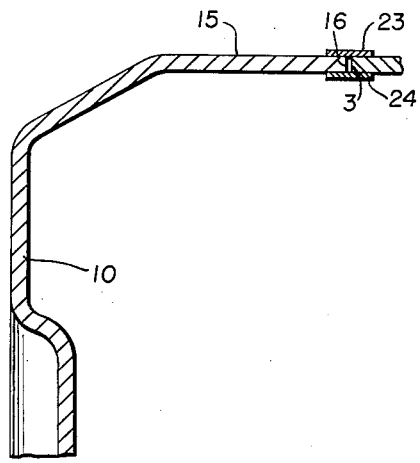
Fig. 3 is a section on the line 3—3 of Fig. 2 through a portion of the front rim of the tub before the apron is welded to it.

The weld is formed by first bringing the edges 3 and 16 close to one another and covering them and the space between them, both top and bottom, with thin metal bands 23, 24 (Fig. 3). These bands are preferably of the same composition as the tub and apron—a low-carbon, deep-drawing enamel iron stock being used. Then the weld is formed with pressure of the rollers 25 and 26 which are the two electrodes. The bands 23 and 24, each about ⅛ to ³⁄₁₆ inch wide and substantially .003 to .005 inch thick, are fed over the top and bottom of the space between the two metal sheets by suitable means and prevent free access of air to this space during the welding operation. Usually 6 to 10 volts will be used, with a current of 10 to 20 thousand amperes, producing a temperature of 2200 to 2300° F.

Figure 4:
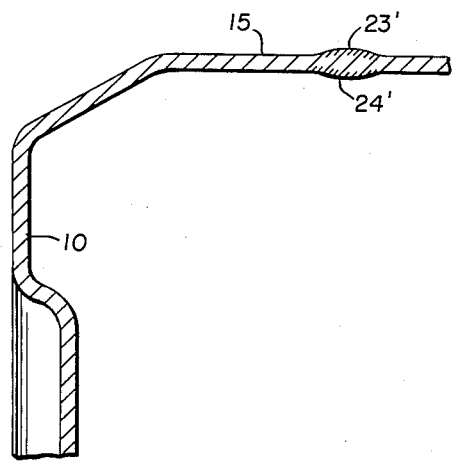
Fig. 4 is a similar section, after welding, on the line 4—4 of Fig. 2.
Figure 5:
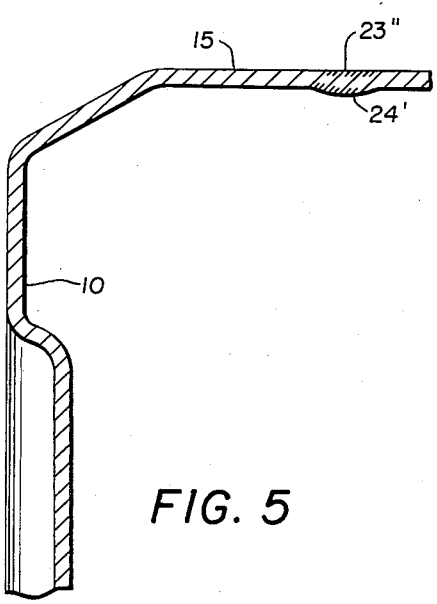
Fig. 5 is a view of the same section as shown in Fig. 4 but after the excess weld material has been removed so as to produce a smooth surface.

The current flowing between the two electrodes causes the abutting edges 3 and 16 to fuse and join, and the rollers press the two bands 23 and 24 into the welded sheets as shown in Fig. 4 at 23' and 24'. The excess metal on the top of the finished weld is readily removed by known means of abrading, as by scurfing or the like, to produce a flat surface as shown in Fig. 5 at 23".

The splash board 30 is now turned up on the edges at the rims 4, 5 and 6 of the tub. The weld is strong and shows no tendency to separate during such bending. This bend is facilitated by notching the back corners of the rim. The front ends of the splash board along the two sides of the finished tub were originally parts of the apron structure. The exact location of the weld is optional. It is preferably sufficiently near the bell so that the flanges 11 of the apron and any depression in the design of the apron do not interfere with free passage of the bottom electrode between the back of the apron and the bell of the tub.

Because of the small working space under the apron, a bar may be substituted for the bottom roller, and then it is not essential to use a ribbon such as the ribbon 24 of metal under the weld. If the weld is located in the portion of the apron which slopes downwardly, away from the bell of the tub, it may be necessary to form the weld before that part of the apron has been bent to its final shape.

In enameling, a ground coat will usually be used and this will be covered by a porcelain covering. The exposed surfaces may be enameled white, with black on the other surfaces, but the colors used are optional, and pastel colors may be used on the exposed surfaces. The tub will be fired at a usual temperature.

Although ordinarily the bell of the tub will be elongated, its shape is not important. The metal of the tub, apron and bands may have the same analysis, but this is not necessary. The rim and apron are usually of the same thickness, but this is not necessary.

The invention is covered in the claims which follow.

What I claim is:

1. A porcelainized sheet-steel bathtub having a bell therein and an apron over at least a portion of the front of the tub, at least a large part of the apron being vertical, a flat-surfaced area between the bell of the tub and the vertical portion of the apron, said apron and bell portion of the tub being butt-welded together along straight-line edges thereof in said flat-surfaced area, the porcelain coating being uniform over the surface of the tub, including the weld.

2. A porcelainized sheet-metal bathtub with an apron butt-welded to the edge of the front rim of the tub between horizontal portions of the apron and the rim, a splash board around the other three edges of the tub, the ends of the weld extending up through the splash board on the respective ends of the tub, the porcelain coating being uniform over the surface of the tub, including the weld.

3. The method of forming a tub which comprises drawing a bell in a sheet of metal and forming a rim around it with a flat portion across it, trimming one edge of said flat portion of the rim to a straight edge, placing a straight edge of a flat portion of an apron which is at least partially formed in substantially abutting contact with said trimmed edge of said rim of the tub, electrically butt-welding the two together and forming therefrom an area with a flat top surface with the weld therein, smoothing off the exposed flat surface of the weld, and thereafter porcelainizing the exposed surface of the tub.

4. The method of forming a tub which comprises drawing a bell in the body portion of the tub and producing a horizontal rim around the bell with a flat-surfaced area in the rim at the front of the tub, trimming the rim at the front of the tub to a straight edge, then electrically butt-welding to this edge a straight edge in a horizontal portion at the top of a fully formed apron to produce an area with a horizontal top surface with the weld therein, the ends of the top of the apron at its said edge flaring outwardly, smoothing off the top surface of the weld, turning up the edges of the rims at the two ends of the tub with said outwardly flared ends of the apron welded thereto to form a splash board, and thereafter porcelainizing the tub.

References Cited in the file of this patent

UNITED STATES PATENTS

| | | |
|---|---|---|
| 2,062,809 | Erickson | Dec. 1, 1936 |
| 2,305,846 | Coordes | Dec. 22, 1942 |
| 2,520,486 | Zeigler et al. | Aug. 29, 1950 |
| 2,534,146 | Rodman | Dec. 12, 1950 |
| 2,763,768 | Coffey | Sept. 18, 1956 |
| 2,817,981 | Brownell | Dec. 31, 1957 |

FOREIGN PATENTS

| | | |
|---|---|---|
| 260,142 | Italy | Sept. 7, 1928 |
| 464,990 | Great Britain | Apr. 29, 1937 |

UNITED STATES PATENT OFFICE
CERTIFICATE OF CORRECTION

Patent No. 2,982,972  May 9, 1961

William H. Bowden

It is hereby certified that error appears in the above numbered patent requiring correction and that the said Letters Patent should read as corrected below.

Column 4, lines 11 and 12, strike out "in a horizontal portion" and insert the same after "edge", first occurrence, in line 11, same column.

Signed and sealed this 3rd day of October 1961.

(SEAL)
Attest:

ERNEST W. SWIDER
Attesting Officer

DAVID L. LADD
Commissioner of Patents